United States Patent [19]

Scheidler

[11] Patent Number: 4,492,217

[45] Date of Patent: Jan. 8, 1985

[54] PANEL ASSEMBLY, PARTICULARLY A GLASS OR VITREOUS CERAMIC HEATER OR COOKER PANEL ASSEMBLY

[75] Inventor: Herwig Scheidler, Mainz, Fed. Rep. of Germany

[73] Assignee: JENAer Glaswerk Schott & Gen., Fed. Rep. of Germany

[21] Appl. No.: 469,976

[22] Filed: Feb. 25, 1983

Related U.S. Application Data

[63] Continuation of Ser. No. 32,873, Apr. 24, 1979, abandoned.

[30] Foreign Application Priority Data

Apr. 29, 1978 [DE] Fed. Rep. of Germany ....... 2819118

[51] Int. Cl.³ .............................................. F24C 3/00
[52] U.S. Cl. .................................. 126/39 B; 219/464; 219/467; 126/148; 126/214 A; 126/214 B; 126/220
[58] Field of Search ................ 126/37 A, 39 B, 39 H, 126/139 M, 148, 214 A, 214 B, 220, 211, 373, 390, 221, 214 D, 214 C, 217, 39 J; 219/464, 443, 467, 468, 542, 345, 455, 458, 459

[56] References Cited

U.S. PATENT DOCUMENTS 3,567,906 3/1971 Hurko ................................ 219/464

FOREIGN PATENT DOCUMENTS 1474977 5/1977 United Kingdom .

Primary Examiner—Randall L. Green
Attorney, Agent, or Firm—Hill, Van Santen, Steadman & Simpson

[57] ABSTRACT

A heater or cooker panel assembly comprises an enameled frame having an upper edge which is capped by a decorative edge trim made of alloy steel. The trim protects the upper edge of the frame against damage in use. The frame has an internal flange which mounts a glass or vitreous ceramic hob plate. A layer of silicone adhesive forms a cohesive unit with the frame and trim so that the hob plate is thermally bonded to the unit. A good bond is obtained between the enameled frame and the adhesive. In an embodiment where the frame is plastic coated or is of anodized aluminum, the trim is dispensed with and a substantially U-shaped profile is engaged over the internal flange of the frame. The U-shaped profile is formed of a material which is capable of being firmly bonded to the adhesive.

9 Claims, 6 Drawing Figures

PANEL ASSEMBLY, PARTICULARLY A GLASS OR VITREOUS CERAMIC HEATER OR COOKER PANEL ASSEMBLY

This is a continuation, of application Ser. No. 032,873, filed 4/24/79, now abandoned.

BACKGROUND OF THE INVENTION

This invention relates to a panel assembly and is particularly, though not exclusively, concerned with an assembly comprising a heater and/or cooker panel adhesively secured to a surrounding frame and/or mounting.

German Gebrauchsmuster Nos. 7401645 and 7406676 disclose cooker hobs wherein the cooking panel or hob plate is adhesively secured inside a frame surround by means of a permanently elastic, thermostable adhesive material. A common feature in these arrangements is that the frame surround does not overlap the hob plate and that the hob plate is adhesively secured to an internal flange provided below the hob plate, the internal flange being provided as an integral part of a continuously extruded profile from which the frame is formed. The arrangement is such that the upper surface of the hob plate is either flush with or about 1-2 mm below the exposed upper edge of the frame.

A gap is provided between the sides of the hob plate and the inner surface of the frame and this is sealed with a permanently elastic sealant. In practice, arrangements of the above described type have the disadvantage that they impose restrictions on the choice of material which can be used in the manufacture of the frame as well as having a relatively narrow field of practical application. For instance, it is a serious drawback that only materials which have a surface quality which enables a good, durable and mechanically firm bond with the adhesive can be used for the frame part. Since anodized or plastic coated surfaces, for example, tend to have poor and mostly indifferent adhesion to silicone adhesives, such materials cannot be used with advantage for making frame surrounds for use in the above described arrangement because a firm, durable bond cannot be guaranteed. The same applies to the use of such materials to form mounting elements used for mounting the hob plate. A further disadvantage of the above described arrangement is that there is a restricted freedom of choice with regard to the configuration of the profile for the frame parts in view of the intended use. For example, while enameled surfaces are very well suited for adhesive securement by means of permanently elastic silicone adhesives, it is impractical to enamel edges which have a small radius of curvature because such edges are highly sensitive to knocks. Consequently, enameled frames with exposed edges are virtually excluded from consideration because the enamel tends to chip off very easily at the curved edges where the radius of the curvature is small, when subject to blows or knocks.

Lastly, there is also a limit to the ability of plastic profiles or of plastic-coated metal profiles to withstand thermal stresses. Adhesive joints can, therefore, be used with frames having such profiles only to a limited extent where the adhesive joint itself would be subjected to unduly high temperatures even though these would still be tolerated by the adhesive itself. Consequently, no plastic frames having such profiles can be used for high heat resistant applications.

BRIEF SUMMARY OF THE INVENTION

It is an object of the present invention to provide a panel assembly in which, at least in the visually exposed regions of the frame and/or mounting elements, there is less restriction with regard to the choice of material than with the above described arrangements.

According to the present invention, there is provided a panel assembly comprising a glass or vitreous ceramic panel, a frame having at least two distinct profiles and/or mounting elements, and a thermostable elastic adhesive, the profiles and adhesive together forming a coherent unit which is bonded by a mechanically firm and sealed joint to the panel.

The profiles of the frame can be of the same material or of different materials and may also be connected together by a number of spot welds or rivets.

BRIEF DESCRIPTION OF THE DRAWINGS

Preferred embodiments of the present invention will now be described, by way of example, with reference to the accompanying drawings, in which.

DESCRIPTION OF PREFERRED EMBODIMENTS

Figure 1:
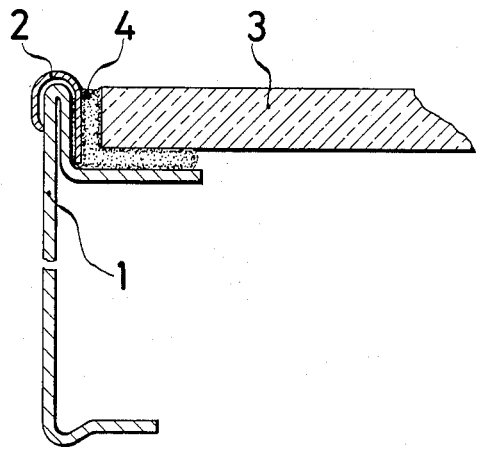
FIG. 1 is a sectional view of part of one preferred embodiment of a panel assembly according to the present invention.

Referring now to FIG. 1 of the drawings, the panel assembly illustrated therein is for a small or laboratory cooker and comprises a profile 1 which forms an enameled frame which surrounds a glass or vitreous ceramic hob plate 3. The hob plate 3 is supported on an integral internal flange of the frame 1. A sharply curved upper edge of the frame 1 is sheathed by a decorative edge trim 2 formed of alloy steel. The decorative edge trim 2 protects the enameled edge of the frame 1 against knocks and scratches while having a good chemical resistance. The hob plate 3 is adhesively secured in the frame profile by means of a permanently elastic, thermostable adhesive 4 which, when cured, serves to bond the profile 1, the trim 2 and the hob plate 3 permanently together by a strong and sealed joint. With the above described embodiment, there is a complete freedom of color choice for the enameled frame surround while the normally knock-and-scratch-sensitive upper edge is protected against chipping of the enamel thereon because of the provision of the edge trim 2.

Figure 2:
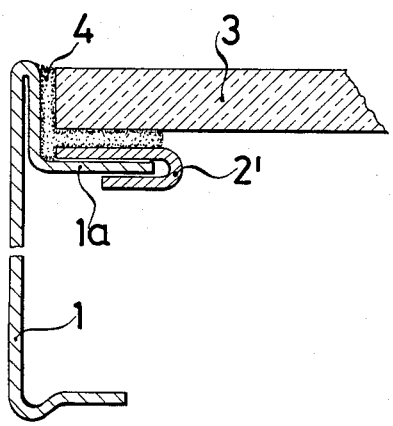
FIG. 2 is a sectional view of part of a second embodiment of panel assembly according to the present invention.

Referring now to FIG. 2, there is shown a panel assembly which is very similar to that of FIG. 1 in that the same shaped frame 1 in profile is provided with internal flange 1a upon which the hob plate 3 rests. However, in this embodiment, the frame 1 is plastic coated. While this greatly improves the vulnerability of the sharply curved upper edge of the profile of frame 1 compared with an enameled profile, it is not possible to obtain a durable bond between the profile 1 and the hob plate 3 by means of a silicone adhesive joint. Thus, in this embodiment, the decorative edge trim 2 of the first-described embodiment is dispensed with a cover profile 2′ is fitted over the flange 1a of the profile 1. This profile 2′ is of generally U-shaped section with one limb shorter than the other, the flange 1a lying between the two limbs of the profile 2′ which is thereby irremovably secured to the profile 1 after securing by means of the adhesive 4. The profile 2′ is formed of a material, e.g., alloy steel or aluminum, which is capable of forming a mechanically strong bond with the adhesive. Thus, the hob plate 3 is firmly secured to the profile 2′, which in turn is firmly and mechanically secured to the flange 1a of the profile 1. Additionally, the silicone adhesive 4 wets the portions of the plastics coated profile 1 with which it comes into contact sufficiently to guarantee a good seal therewith.

Figure 3:
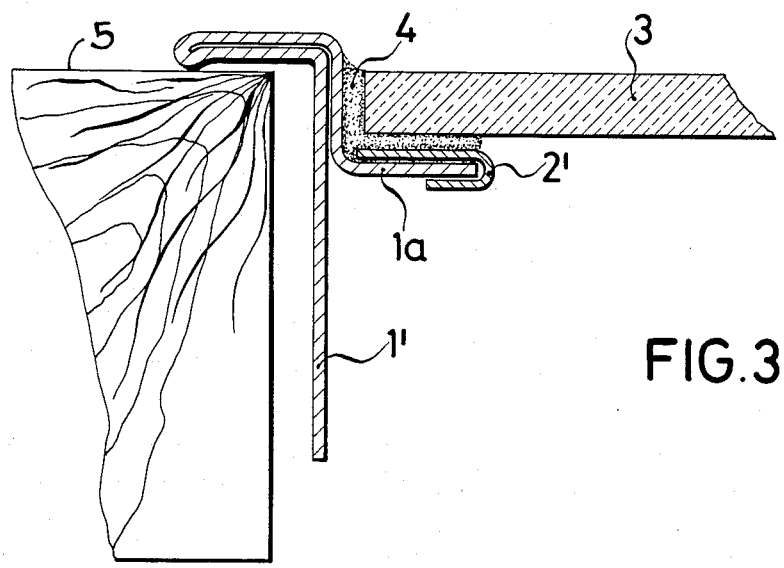
FIG. 3 is a sectional view of part of a third embodiment of panel assembly according to the present invention.

Referring now to FIG. 3 of the drawings, there is shown a profile 1′ which is formed of anodized aluminum, which is of a shape to enable the hob plate 3 to be built into a working surface. A folded portion of the frame profile extends out laterally to provide a support for the hob plate 3 when it is to be attached to a mantel or other support 5. To make a durable sealed and strong joint, internal flange 1a of this profile 1 is covered by a U-shaped profile 2′ of alloy steel or aluminum in a similar manner to that described with reference to FIG. 2. A silicone adhesive 4 is injected into the gap between the hob plate 3 and the profile 1 and the profile 2′. When the adhesive has cured, the profile 2′ is mechanically firmly and inseparably bonded to the hob panel 3. At the same time, there is at least an adequate seal between the hob panel 3 and the anodized profile of the frame 1.

Figure 4:
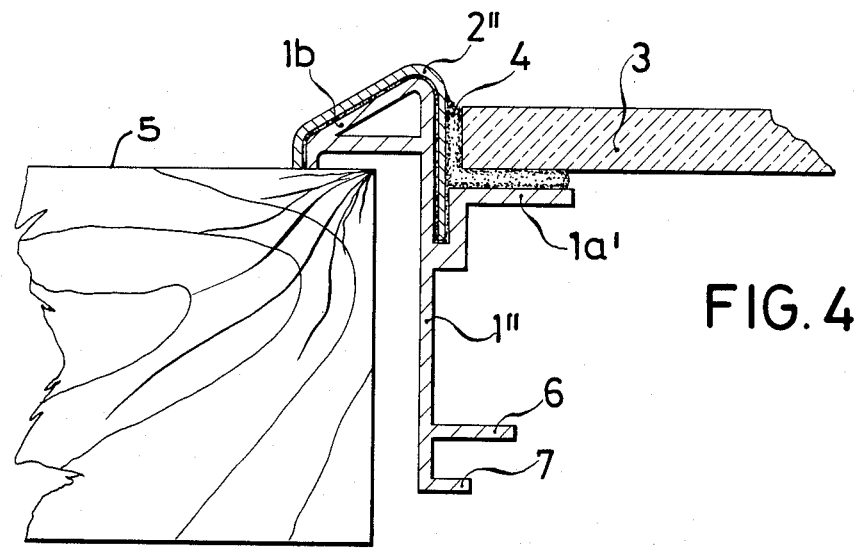
FIG. 4 is a sectional view of part of a fourth embodiment of panel assembly according to the present invention.

Referring now to FIG. 4 of the drawings, there is shown another form of frame profile 1″, which is of continuously extruded aluminum for a built-in hob panel 3. In order to improve resistance to scratches, a thin, suitably shaped alloy steel profile 2″ is used to cap the frame profile 1″ in the region of an otherwise visually exposed, upper edge 1b of the frame profile 1″. A silicone adhesvie 4 is injected between an internal mounting flange 1a of the aluminum profile 1″ and the profile 2″ as well as between the upper edge 1b and the profile 2″ and between the hob plate 3 and the flange 1a′ and profile 2″. As can be seen from FIG. 4, the flange 1a′ of the profile 1″ is configured to define a recess in which one longitudinal edge of the profile 2″ is fitted. When the adhesive 4 has cured, the profiles 1″ and 2″ form, together with the adhesive 4, an indissoluble, mechanically secure and sealed unit which is firmly bonded to the hob plate 3.

A particular advantage of this embodiment is that it affords an unrestricted freedom of choice with regard to the aluminum profile 1″, which is of relatively low cost. For example, it may be provided with integral securing strips or flanges 6 and 7, while the upper edge 1b thereof which would otherwise suffer knocks and scratches is provided, without significant additional outlay, with the protective alloy steel profile 2″.

Figure 5:
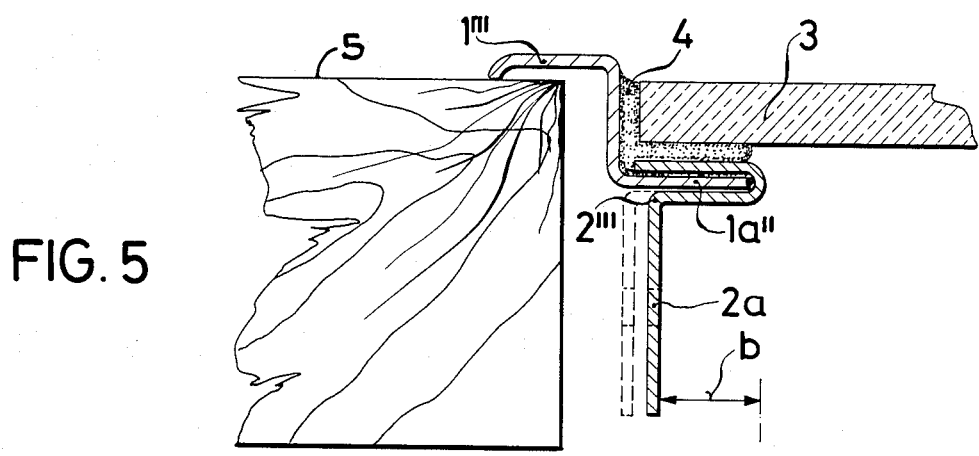
FIG. 5 is a sectional view of part of a fifth embodiment of panel assembly according to the present invention.

Referring now to FIG. 5 of the drawings, the embodiment illustrated therein is a highly preferred embodiment because, while being comparatively low priced, it is extremely adaptable to a wide range of practical applications. The portion of profile 1‴ of frame can be made of alloy steel, or enameled or plastic coated sheet metal for example. By forming this part in a deep-drawing operation, it is possible to obtain a fully closed continuous frame surround without any unsightly welded joints. This frame can be made of any desired polygonal or round shape. A profile of the kind illustrated in FIG. 5 is also very easy to produce at low cost since it requires only very few pressing operations or passes. The frame profile 1‴ has a circumferentially continuous mounting flange 1a″ extending below the marginal portion of the hob plate 3 which is sheathed by a second profile 2‴, which may also be circumferentially continuous or which may consist of discrete sections. The frame part 2‴ is nested over the inwardly extending flange 1a″. Frame part 2‴ has a vertical extending flange or limb 2a which may be provided with stamped formations or otherwise formed securing elements of any desired shape without requiring a separate tool for this purpose in the manufacture of the frame profile 1‴. Additionally, with the same profile 1‴, the dimension b of the profile 2‴ may be varied so that it is very easy to provide different dimensions b where this may be required, e.g., for a cover tray. As a result of this arrangement, it is simple, at only small additional tool cost, even to mass produce frames of different materials and different geometrical shape in order to produce a frame unit which is adhesively fixed by a mechanically strong and sealed bond to the hob plate 3.

Figure 6:
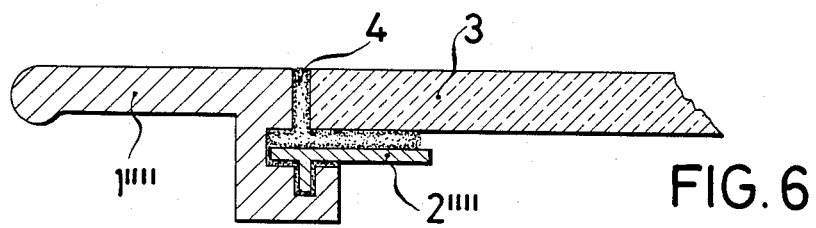
FIG. 6 is a sectional view of a sixth embodiment of a panel assembly according to the present invention.

Referring now to FIG. 6 of the drawings, a plastic profile 1ʺʺ, e.g., in the form of a handle strip or bar, is joined to an aluminum profile 2ʺʺ and is connected with a glass or vitreous ceramic hob plate 3 by means of an adhesive 4. As can be seen from FIG. 6, the adhesive 4 separates the plastic profile from the plate 3 so that the former remains comparatively cool despite the high thermal load applied to the adhesive joint in the region of profile 2ʺʺ. The adhesive 4 which is forced into the gaps between the profiles 1ʺʺ and 2ʺʺ and also between the plate 3 and the individual profiles 1ʺʺ and 2ʺʺ securely joins together all three parts to make a permanent joint when the adhesive has been cured.

The profile in the form of a handle strip or bar may extend completely around the glass plate 3 or may be a simple cured element.

It is to be appreciated that the present invention is applicable not only to glass or vitreous ceramic heater panels but is applicable quite generally to the adhesive securing of any surfaces or panels of such materials which are subject to thermal loads and stresses, for example, solar collector cover plates.

It will be apparent to those skilled in the art that many modifications and variations may be effected without departing from the spirit and scope of the novel concepts of the present invention.

I claim as my invention:

1. A heating panel assembly comprising:
   a glass hob plate;
   a supporting frame for said hob plate having a first frame profile including a flange extending beneath said hob plate for supporting said hob plate such that a gap exists between the bottom and sides of said hob plate and said first frame profile, a second frame profile covering a portion of said first profile adjacent said hob plate rigidly connecting said first and second profiles during assembly; and
   a thermostable elastic adhesive completely filling said gap between said first profile and said hob plate sides and further disposed between said second profile and said hob plate bottom for bonding said first profile, said second profile and said hob plate and forming a non-detachable continuous joint between said first profile and said hob plate, said surface of said second profile being comprised of a material selected for forming a strong mechanical bond with said adhesive.

2. The heating panel assembly of claim 1 wherein said first profile has a generally vertical portion having a free end substantially perpendicular to said flange, and wherein said second frame profile has a hook covering said free end of said generally vertical portion of said first profile for rigidly connecting said first and second profiles during assembly.

3. The heating panel assembly of claim 1 wherein said flange has a free end and said second frame profile has a hook covering said free end of said flange for rigidly connecting said first and second profiles during assembly.

4. The heating panel assembly of claim 1 wherein said first profile has a support member extending substantially parallel to said flange in a direction away from said hob plate for permitting said first profile to rest on an external surface, and wherein said second frame profile has a hook covering said support member for rigidly connecting said first and second profiles during assembly.

5. The heating panel assembly of claim 4 wherein said first profile has a vertical leg extending below said hob plate.

6. The heating panel assembly of claim 5 wherein said downwardly depending vertical leg of said first profile carries at least one additional flange thereon substantially parallel to said flange extending beneath said hob plate.

7. The heating panel assembly of claim 1 wherein said first profile has a support member extending substantially parallel to said flange in a direction away from said hob plate for permitting said first profile to rest on an external surface, wherein said flange has a free end, wherein said second profile has a hook carried on said second profile covering said free end of said flange, and wherein said second profile has a downwardly depending vertical leg for rigidly connecting said first and second profiles during assembly.

8. The heating panel assembly of claim 1 wherein said first profile has a support member extending substantially parallel to said flange in a direction away from said hob plate for permitting said first profile to rest on an external surface, and wherein said first frame profile has a recess receiving a tab carried on said second profile for rigidly connecting said first and second profiles during assembly.

9. The heating panel assembly of claim 1 wherein said first frame profile consists of two substantially parallel legs extending in opposite directions in different planes, one of said legs forming said flange and the other of said legs forming a means for permitting said first profile to rest on an external surface, and a generally vertical central member connecting said two legs.

* * * * *